(12) United States Patent
Foster (10) Patent No.: US 8,893,704 B2
(45) Date of Patent: Nov. 25, 2014

(54) CONVERTIBLE GRILL AND SMOKER

(76) Inventor: Robert Foster, Mobile, AL (US)

( * ) Notice: Subject to any disclaimer, the term of this patent is extended or adjusted under 35 U.S.C. 154(b) by 233 days.

(21) Appl. No.: 13/427,356

(22) Filed: Mar. 22, 2012

(65) Prior Publication Data

US 2012/0192722 A1 Aug. 2, 2012

Related U.S. Application Data

(63) Continuation of application No. 12/214,024, filed on Jun. 16, 2008, now abandoned.

(51) Int. Cl.
*F24C 1/16* (2006.01)
*A47J 37/07* (2006.01)

(52) U.S. Cl.
CPC .......... *A47J 37/0704* (2013.01); *A47J 37/0786* (2013.01)
USPC .............. 126/9 R; 126/12; 126/25 R; 126/26; 126/29; 126/30; 126/38; 99/341; 99/449

(58) Field of Classification Search
CPC ...... A47J 37/0704; F24B 1/181; F24B 1/192; F24B 13/002; F24C 15/36
USPC ........ 126/25 R, 26, 29, 30, 38, 9 R, 500, 505, 126/506, 510, 511, 519; 99/340, 341, 449; D7/332, 334
See application file for complete search history.

(56) References Cited

U.S. PATENT DOCUMENTS

| | | | | |
|---|---|---|---|---|
| 168,809 A | * | 10/1875 | Timby | 220/694 |
| 610,555 A | * | 9/1898 | McNamee | 126/544 |
| 2,379,206 A | * | 6/1945 | Westlake | 126/24 |
| 3,777,735 A | * | 12/1973 | Miller | 126/519 |
| 4,121,798 A | * | 10/1978 | Schumacher et al. | 248/113 |
| 4,167,177 A | * | 9/1979 | Wigins | 126/531 |
| 4,203,416 A | * | 5/1980 | Simpson et al. | 126/212 |
| 4,332,188 A | * | 6/1982 | Rhear | 99/323.5 |
| 4,512,249 A | * | 4/1985 | Mentzel | 99/352 |
| 4,587,947 A | * | 5/1986 | Tomita | 126/25 R |
| D286,494 S | * | 11/1986 | Lastuck | D7/363 |
| 4,638,786 A | * | 1/1987 | Lucky | 126/24 |
| 4,732,138 A | * | 3/1988 | Vos | 126/25 A |
| 4,745,905 A | * | 5/1988 | Lucky | 126/24 |
| 4,930,491 A | * | 6/1990 | Purello | 126/332 |
| 5,310,147 A | * | 5/1994 | Billman | 248/214 |
| 5,421,321 A | * | 6/1995 | Ward | 126/519 |
| 5,489,075 A | * | 2/1996 | Ible | 248/104 |
| 5,490,452 A | * | 2/1996 | Schlosser et al. | 99/422 |
| 5,564,330 A | * | 10/1996 | Nowicke, Sr. | 99/340 |
| D375,347 S | * | 11/1996 | Whalen et al. | D23/317 |
| 5,678,531 A | * | 10/1997 | Byers et al. | 126/25 R |
| 5,755,151 A | * | 5/1998 | Nowicke, Sr. | 99/340 |
| 5,768,977 A | * | 6/1998 | Parris et al. | 99/340 |

(Continued)

*Primary Examiner* — Jorge Pereiro (57) ABSTRACT

A grill having a bottom section and a middle section for expanding the diameter of the bottom section and at least one insert for separating the opening formed by the bottom section to allow smoking or an open fire. Different cooking surfaces are thereby a grill, a flat frying surface, an open area for receiving and holding a reservoir of water, such as a pot, and an open area for receiving a wok. There is also a hearth section for enclosing at least a portion of the exterior of the bottom section. It also envisions a smoker or ash guard expandable to fit either diameter to protect the cook and provide a surface for placing items attached to the stand apart from the heat source.

4 Claims, 8 Drawing Sheets

(56) References Cited

U.S. PATENT DOCUMENTS

| | | | |
|---|---|---|---|
| 5,836,298 A * | 11/1998 | Grady | 126/506 |
| 5,839,361 A * | 11/1998 | Richter | 99/422 |
| 6,016,797 A * | 1/2000 | Nowicke, Jr. | 126/25 R |
| 6,289,795 B1 * | 9/2001 | McLemore et al. | 99/400 |
| 6,425,387 B1 * | 7/2002 | Rohback, Jr. | 126/9 R |
| 6,543,435 B1 * | 4/2003 | Regen et al. | 126/25 R |
| 6,626,090 B2 * | 9/2003 | McLemore et al. | 99/340 |
| 6,755,188 B2 * | 6/2004 | Skidmore et al. | 126/25 R |
| 6,779,438 B1 * | 8/2004 | Citrynell et al. | 99/347 |
| 6,802,312 B1 * | 10/2004 | Kuelbs | 126/519 |
| 6,918,387 B2 * | 7/2005 | Klarich et al. | 126/201 |
| 7,063,007 B2 * | 6/2006 | Citrynell et al. | 99/347 |
| 7,344,173 B2 * | 3/2008 | Gonzalez et al. | 294/27.1 |
| 7,383,836 B2 * | 6/2008 | Klemming | 126/506 |
| 7,533,605 B1 * | 5/2009 | Morgan | 99/410 |
| 7,861,705 B2 * | 1/2011 | Hulsey | 126/25 A |
| D668,096 S * | 10/2012 | Simms, II | D7/334 |
| 8,360,049 B2 * | 1/2013 | Stephens | 126/500 |
| 8,464,702 B2 * | 6/2013 | Foster | 126/25 R |
| 2004/0020484 A1 * | 2/2004 | Skidmore et al. | 126/25 R |
| 2004/0211410 A1 * | 10/2004 | Kuelbs | 126/519 |
| 2004/0255930 A1 * | 12/2004 | Klemming | 126/506 |
| 2005/0121018 A1 * | 6/2005 | Rosen | 126/9 R |
| 2005/0126556 A1 * | 6/2005 | Bossler | 126/25 R |
| 2006/0087135 A1 * | 4/2006 | Gonzalez et al. | 294/27.1 |
| 2006/0090743 A1 * | 5/2006 | Hsu | 126/211 |
| 2009/0199839 A1 * | 8/2009 | Hulsey | 126/25 A |
| 2009/0199842 A1 * | 8/2009 | Foster, Jr. | 126/25 R |
| 2010/0258105 A1 * | 10/2010 | Simms, II | 126/25 R |
| 2010/0258106 A1 * | 10/2010 | Simms, II | 126/25 R |
| 2010/0269713 A1 * | 10/2010 | Foster | 99/482 |

* cited by examiner

CONVERTIBLE GRILL AND SMOKER

PRIORITY

This is a continuation of provisional patent application Ser. No. 60/936,671 titled the same filed Jun. 21, 2007 and utility application Ser. No. 12/214,024 filed Jun. 16, 2008.

BACKGROUND OF INVENTION

The invention relates to grills, fireplaces and smokers, grills with smoker conversion and grills with fireplace conversion.

FIELD OF INVENTION

The invention pertains to grills, fireplaces and smokers.

In particular, the invention pertains to a smoker which converts into a grill and the grill having a fireplace conversion and specialized cooking and display surfaces.

PRIOR ART

Smokers and grills exist, as do outdoor fireplaces.

The primary improvement of the present invention is in allowing a single fireplace to convert easily for the use of a smoker, a fireplace or a grill and to provide for novel cooking surfaces within the product in order to have a product which provides a novel entertainment and cooking device.

GENERAL DISCUSSION OF THE INVENTION

It is therefore, one purpose of the invention to provide a three in one grill which functions as a fireplace, grill, and smoker.

It is a further an object of the invention to provide a smoker which allows for variable air to enter by having a plurality of panels.

It is a further an object of the invention to provide a smoker which can convert from one size to another depending on the requirements of the user in order to provide efficiencies in fuel use by having a larger fire pit when required, but otherwise to allow the user to have a smaller fire pit.

It is further an object of the invention to provide an outdoor grill to provide a cooking surface providing for a greater variety of foods to be cooked.

It is further an object of the invention to provide a cooking surface which allows the user to control he amount of protection provided at the perimeter of the cooking device to allow it to be safely approached by a plurality of sides and to be more closely approached on the side where the cook is performing the cooking function.

These and other objects and advantages of the invention will become better understood hereinafter from a consideration of the specification with reference to the accompanying drawings forming part thereof, and in which like numerals correspond to parts throughout the several views of the invention.

BRIEF DESCRIPTION OF THE DRAWINGS

For a further understanding of the nature and objects of the present invention, reference should be made to the following detailed description taken in conjunction with the accompanying drawings in which like parts are given like reference numerals.

DETAILED DESCRIPTION OF THE PREFERRED EXEMPLARY EMBODIMENTS

Figure 1:
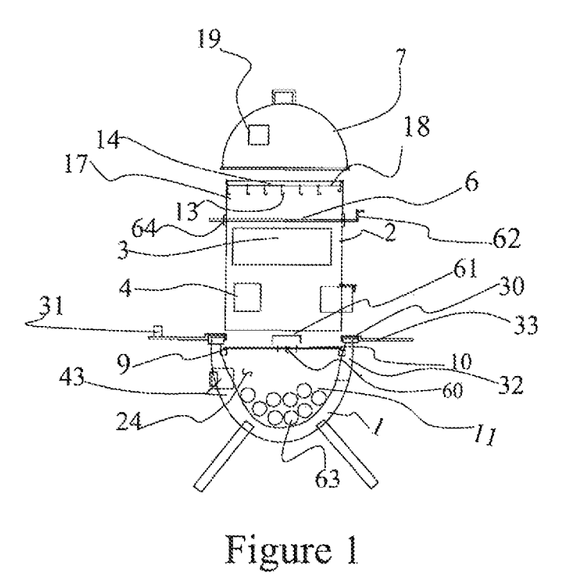
FIG. 1 shows a fully assembled smoker using the invention disclosed.

As can best be seen by reference to FIG. 1, the invention comprises a grill 10 having a support means here heat lips 9 to support the grill 10.

The grill has an opening 60 with a grill opening cover 61 which is a grill insertable to a fixed location over the grill opening 60.

The invention further comprises a plurality of removable and insertable middle sections 2, here defining a front door 3 for access to the interior, first open area 24 at the front and a back door opening 4 at the back. Traveling from one side to the other is a spit 6 operated by an operating means, here a crank 62 so that something may be rotated utilizing the crank 62 and treated with various basting sauces through either of the doors 3 and 4 or a top door 19. The door is large enough to load an item onto the spit 6.

Additionally, there is a solid cover 7 attachable either over the rim top 8 of the bottom section 1 or over the middle section 2 in order to close either of them operationally as a grill or smoker.

There is also a wood grill 10 above the coal area 11. Above the coal area 11 the wood grill 10 may hold wood chips for adding smoking wood flavors.

There is also a hook means, here a line of hooks 13 on a hook arm 14, which is attachable to the top or to the upper grill for purposes of hanging various foods. The hooks 13 may be at various locations so different products can be treated at a higher or lower location.

There is also a hook adjusting means in the form of a hook supporting arm 17 which extends at adjustable heights below the top of the middle section 2 in order to raise and lower the level of the hooks 13 for the same purpose.

There is an adjustable top door 19 to go from very large to very small to allow basting from the top or to allow various spices from the top or in order to allow smoke to escape or in order to maintain the solid cover 7 alternatively in the closed position.

As can best be seen by reference to FIG. 1, the invention comprises a grill 10 having a bottom section 1 and a solid cover 7 and a bottom depth extension 32 insertable between the base and the top 18.

Figure 8:
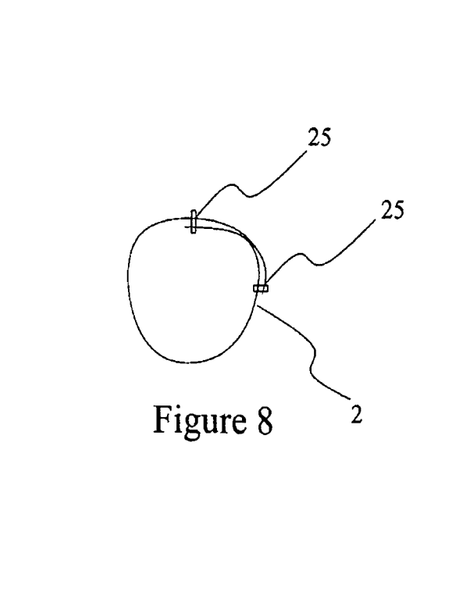
FIG. 8 shows a cross sectional view through the 8-8 section of FIG. 7 showing the expandable design for the middle section.
Figure 9:
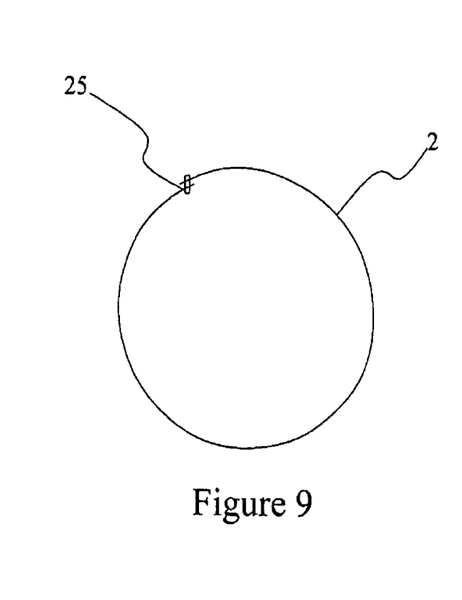
FIG. 9 shows the embodiment of FIG. 8 fully expanded.

The interior design of the bottom section 1 defines a series of attachment means (grooves, clips, or bolts as shown in FIGS. 8 and 9, etc.) which allow for an expandable middle section 2 to be resized and to fit so that a smoker or fireplace screen of various sizes and dimensions can be accomplished.

Figure 2:
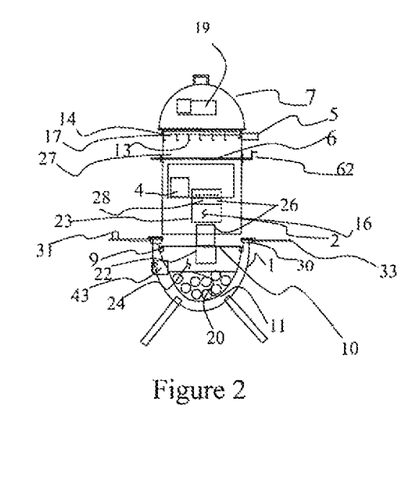
FIG. 2 shows the smoker in FIG. 1 with a steamer installed.

FIG. 2 shows a view of the hearth 33 which may be used with or in place of the other middle section 2. The hearth 33 is supported on supports 30 and may be held with bolts 25 (not shown) and allows the grill 10 to be treated as an out door fireplace with cup holders 31 and provides a support for an expanded middle section 2 as shown in FIG. 9.

FIGS. 3, 4, 5 and 6 show how the bottom section and cover may change in order to allow for the invention shown in FIGS. 1 and 2 to be modified for different purposes.

Figure 3:
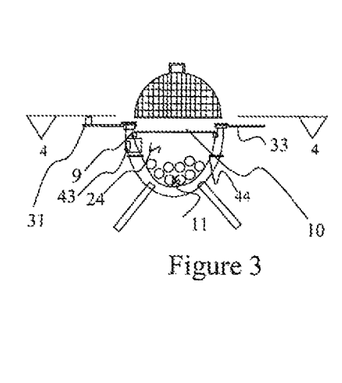
FIG. 3 shows the steamer of FIG. 1 with the middle section removed and the alternate lid.

As can be seen by reference back to FIG. 3, the hearth 33 may also be mounted at the top of the extension for a larger cooking surface as described in more detail below.

Figure 4:
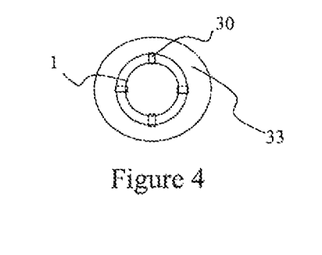
FIG. 4 shows the embodiment of FIG. 3 from a top view through the 4-4 axis of FIG. 3.

FIG. 4 shows a top view to show how the hearth 33 is held by supports 30 away from the
bottom section 1 and the supports may limit heat conduction so that the fire and heat do not as strongly impact the hearth.

Figure 5:
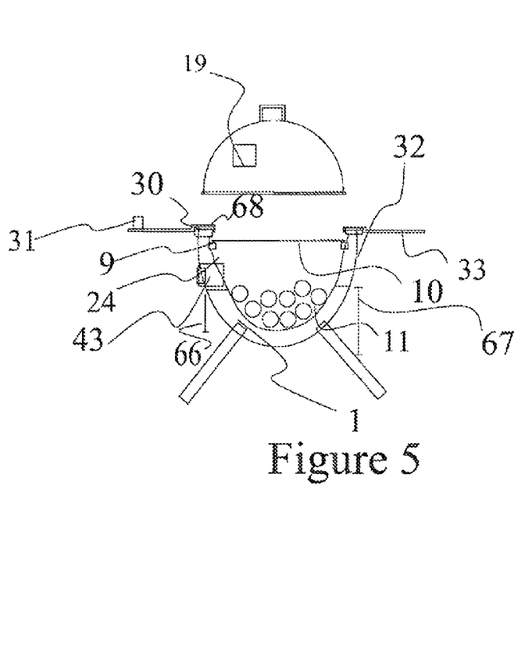
FIG. 5 shows one embodiment of FIG. 3 with the sealed lid.

FIG. 5 shows how there is a first height 66 without the extension and a second height 67 with the attachment of the extension 32 which helps the user to determine that in the embodiment shown in FIG. 5 that the bottom depth extension 32 is properly aligned with the bottom section 1.

Referring to FIG. 5 there is a clip 68 at the end of the hearth 33 which connects over the supports 30 at the top of either the bottom section 1 or bottom depth extension 32.

Figure 6:
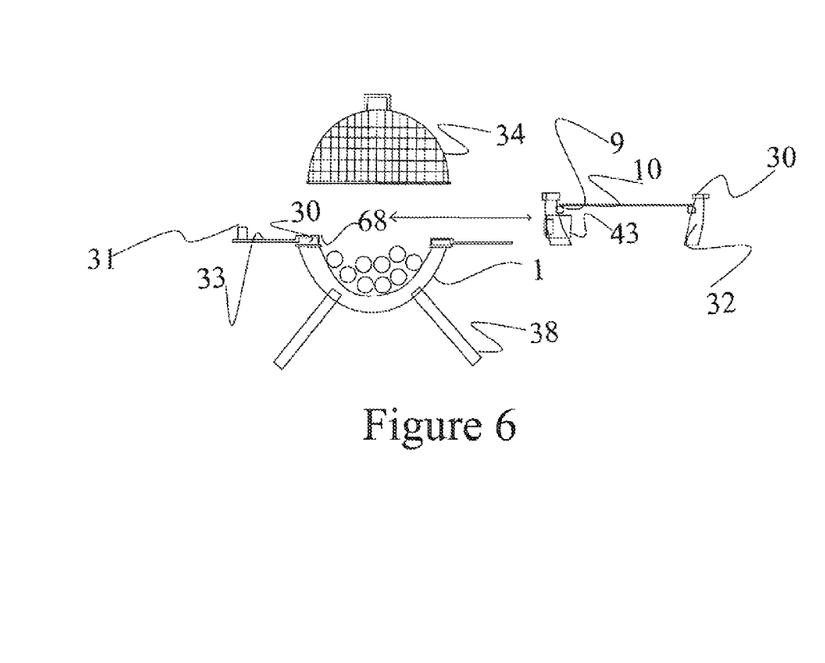
FIG. 6 shows the embodiment of FIG. 3 with the bottom depth extension pulled out.

Referring to FIG. 6, it can be seen that there is a bottom depth extension 32 which can extend the height and consequently the (depth of section 1) or width of the bottom section 1. As shown here, there is a middle door 43 which allows coals to be added below the grill 10 so that the fire can be maintained with the smoker in place for longer cooking times.

This view shows how the hearth 33 can fit onto the bottom section 1 when the bottom depth extension 32 is removed in order to allow for an alternate screened cover 34 when the invention is being used as a fireplace.

As shown in FIG. 2, with the grill opening cover 61 removed, there is a second grill for the bottom containing a heat resistant fluid reservoir 22 which may be put in place so that foods within the top sections may be steamed. There is a steamer 23 receiving steam from the fluid reservoir 22 in order to provide a steamer interior 16 first open area 24 for steaming within the steamer and a first open area 24 around the steamer for smoking various meats or cooking them at various levels of heat. The steamer interior 16 has grill floors 26 for holding steamed foods.

In the preferred embodiment, the top of the first open area 24 is sufficiently tall in order to provide that it may contact the solid cover 7 when the middle section 2 is in place. The device may be used for grilling, steaming and smoking.

The device also includes at least one grill which has a lower location with a holding means for holding it at the lower location which is preferably brackets and a raised location with a raised location holding means, preferably lips 9, so that the grill may be placed at the lower location for grilling and the raised location for smoking when the extension 32 is in place.

The invention further comprises a middle door 43 in the bottom section or bottom depth extension 32 (as shown) which allows for the fire to be tended in the bottom section 1 of the grill 10 during a long smoking process.

A smoker is therefore described comprising a grill bottom section 1 means for accepting a heat source such as charcoal 63 (a gas heat or wood can be used) and having a holding means, preferably one or more brackets 44 below the top 4-8 of the bottom section 1 and a removable middle section 2 having a second holding means (lips 9) for holding a grill 10 and a solid cover 7 insertable over the grill 10 or spit 6 or middle section 2 in order to enclose the grill or the smoker comprised of the grill and the middle section 2.

Figure 7:
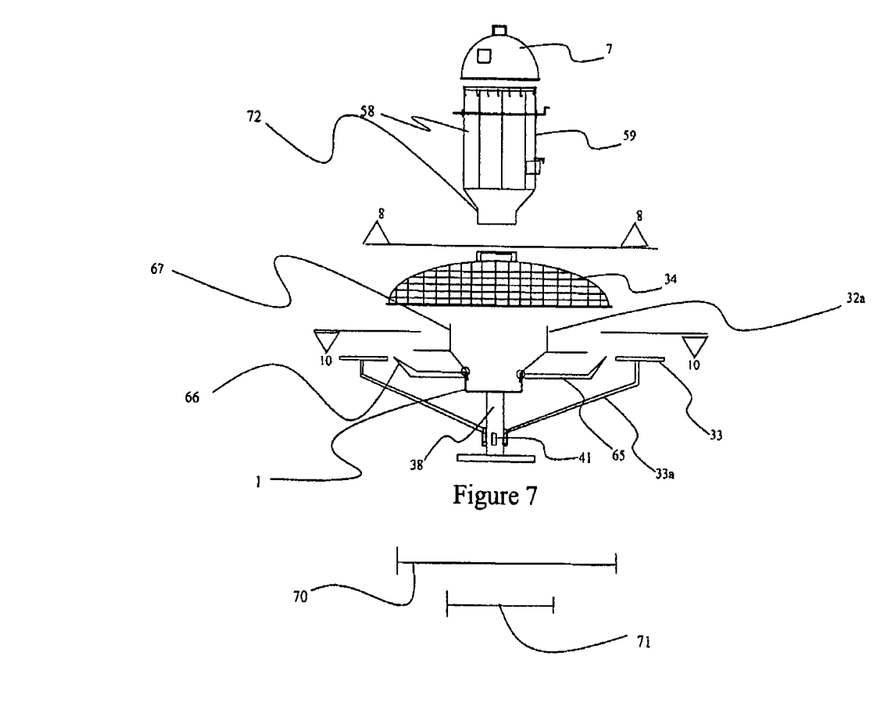
FIG. 7 shows an exploded view of the embodiment shown in FIG. 6 showing the independently supported hearth. Also shown above the fire area is the middle section and first cover as well as the alternate screened cover.
Figure 12:
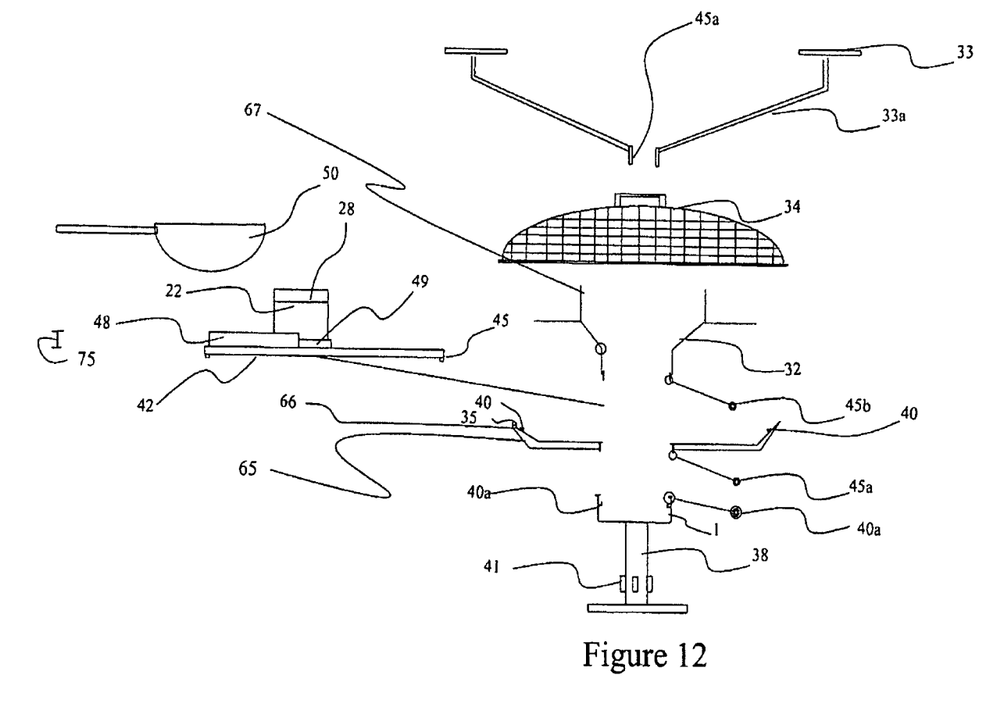
FIG. 12 shows a cross section view of an exploded view of FIG. 7 with the insertable cooking layout.

As can best be seen by FIG. 7 and the exploded view of FIG. 12 in conjunction with FIGS. 8 & 9, the invention is comprised of various interchangeable sections in order to provide a fireplace having fireplace section 65, which substitutes for middle section 2, which fireplace section 65 has less depth (a first height 66) than the smoker extension 32a to allow cooking on a fireplace over the bottom section 1 and middle section 2 (traveling up to a second height 67).

In the embodiment shown in FIG. 6, the invention has a removable section extension 32 so that the actual pot portion may be of one size for smaller cooking and then maybe extended in size or depth or both in order to allow for a larger cooking surface or, as taught herein, in order to accommodate a fireplace and independently supported rim or hearth 33 here supported on the grill rim itself.

In order to allow for the other purposes, the extension may be replaced with a screened extension of an expandable or contractible size or the solid top 7 may be replaced with a screened cover 34 of the type shown in FIG. 7.

The depth of the bottom section 1 may be increased and the size may be increased slightly by utilizing a removable bottom depth extension 32, which may only increase the depth, but in the embodiment shown, not only increases the depth but also increases the cooking area by increasing the diameter width.

A middle section 2 shown in FIG. 8 and FIG. 9 is expandable to fit either the smaller diameter bottom section 1 (FIG. 8) or the expanded area of the bottom depth extension 32 (FIG. 9) by way of bolts 25 going into bolt holes 51-56 (FIG. 11) or other fixing means for fixing the diameter, which hold the device at different circumferences corresponding to the area enclosed.

Figure 10:
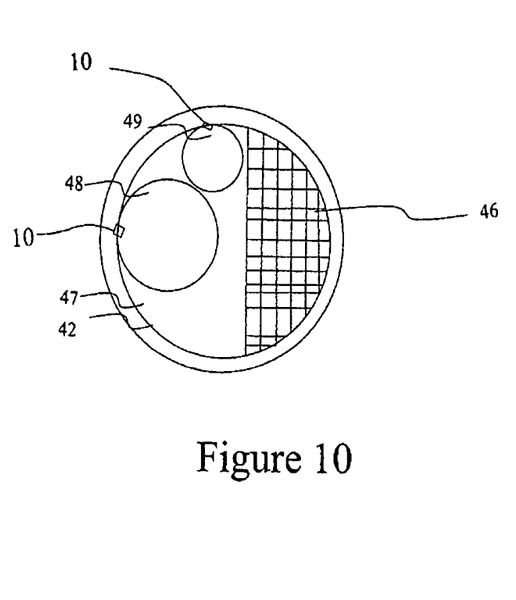
FIG. 10 shows the view of the cooking surface.

The insert which is shown for FIG. 10 comprises a rim insert 42 having a solid fryer section 47 and a screen grilling section 46. Rings 48 and 49 act as a steamer support ring 49 and wok support ring 48 and may be held to the raised rim 44 of the rim insert 42 utilizing clips 12. In this embodiment, the area covered by the solid fryer section 47 is approximately one half of the screen section 46 which is covered by a screen 46 and instead of replacing the entire screen with a half screen and half fryer section 47, the fryer section 47 could lay over the screen 46.

Figure 14:
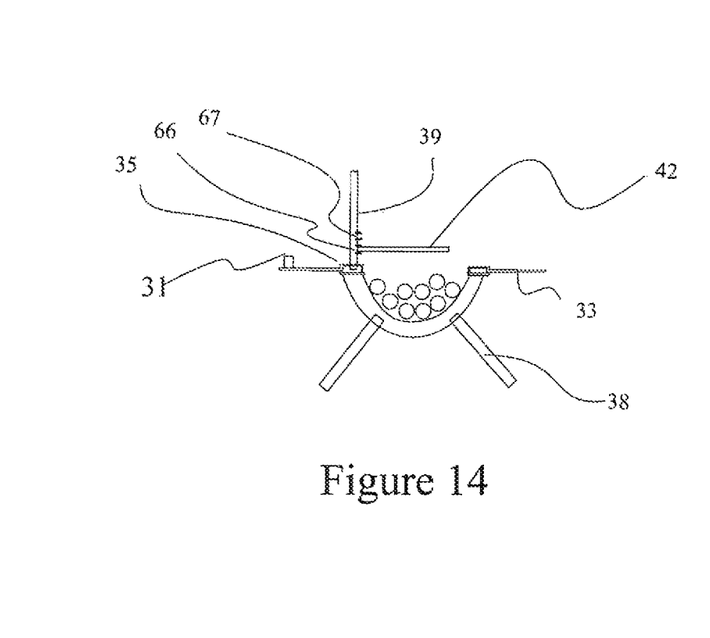
FIG. 14 shows the embodiment of FIG. 5 with the hibachi holder put in place of the bottom depth extension.

Three types of clips are envisioned for the invention. First there are rim clips 35 which are shown in FIG. 14 which can be used to hold a hibachi 39. Second, there are internal clips 40 shown in FIG. 12 which in this case hold either the hibachi 39 or the rim insert 42. The rim insert 42 in FIG. 12 is held in at least three places along the fireplace section 65 at a height determined by the height of the internal clips 40 above the base and there are cooperating inserts 45 along the perimeter of the rim insert 42 which cooperate with the internal clips 40 to hold the rim insert 42 in place.

Figure 11:
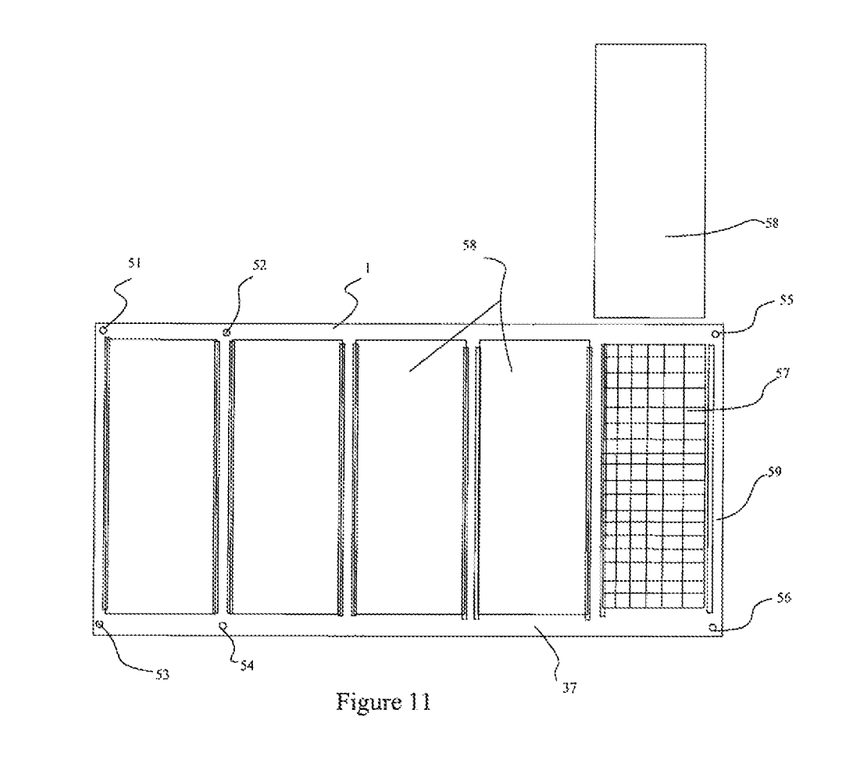
FIG. 11 shows removable panels with the middle section.

FIG. 11 shows the middle section 2 opened up showing that there are at least two joining locations represented by first top bolt holes 51 and first bottom bolt holes 53 to which top adjusting bolt holes 55 and bottom adjusting bolt holes 56 may be joined by a bolt 25 (FIGS. 8 and 9) and a second top bolt hole 52 and a second bottom bolt hole 54 so that the two different sizes shown in FIGS. 8 and 9 may be accomplished.

In FIG. 11, there are screens 57 which may be covered by sliding panels 58 into guides 59 so that more screens (acting as an ash guard) may be opened or the screens may be completely closed for smoking or the display of flame utilizing a middle section 2 as either an open screened area or closed or partially closed smoker. For example, half may be closed to reflect heat out of the other half. The screens may also be removable leaving just the guides 59 and frame 37.

Figure 13:
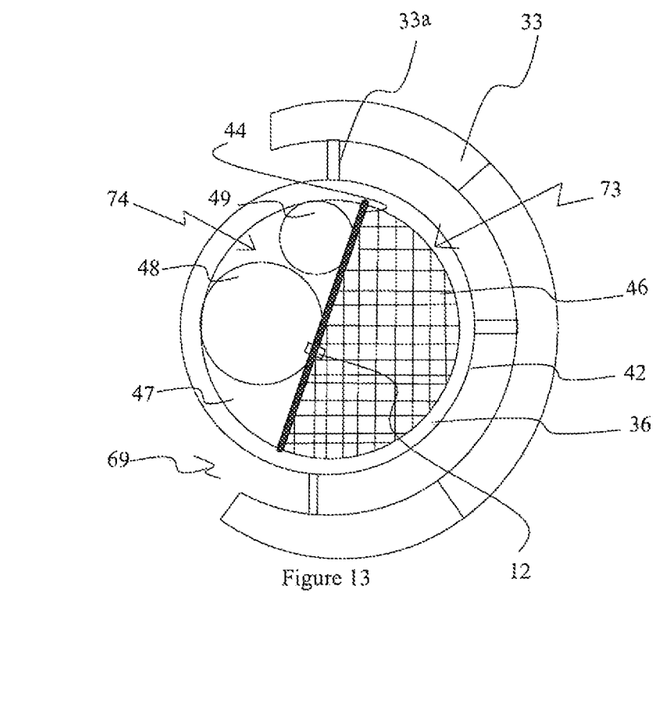
FIG. 13 shows a top view of the cooking layout shown in FIG. 12 when assembled without items 40, 32 and 34 and with the cooking surface shown moved outward in FIG. 10.

In the exploded view shown in FIG. 12, one or more of four sections of the hearth 33 may be left off in order to allow there to be a hearth 33 with an opening 69 as shown in FIG. 13 where three sections of hearth 33 joined by three items 33*a* leave an opening within which the cook may move to cook.

The lip 44 of the solid section 47 shown in FIG. 13 is raised so the clip 12 holding item 48 can clip to this raised lip 44. This allows for the solid section 47 with a raised lip 44 to be inserted over the grill. The raised lip 44 gives a place to push foods so that they do not spill over onto the grill. A portion of the lip 44 may not be raised so that foods can intentionally be pushed over to the grill or from the grill to the section 47.

As shown in FIG. 12, in this embodiment, the rim insert 42 has a screened grilling section 46 as well as a solid fryer section 47, a wok support 48 for a wok 50 and an open steamer support 49 to receive the fluid reservoir 22 above which at least one steamer basket 28 can be added. The external clips 41 in this case are attached to the stand 38 and received the cooperating inserts 45*a* of the hearth 33 so that the hearth 33 is not directly affected by the heat from the bottom section 1.

The stand 38 is preferably adjustable in height or there may be multiple sets of external clips 41 at different heights in order to accommodate raising or lowering the hearth 33.

A second set of internal clips 40*a* are present in the bottom section 1 in order to receive cooperating inserts 45*a* at the bottom of the fireplace section (middle section 2) in order to allow the widening of the fire to receive the rim insert 42. A smaller rim insert of the same description may be used with the bottom section 1.

In this embodiment, there is a second deeper section which is the bottom depth extension 32 which is an alternate to the middle section 2 for the same purpose which has cooperating inserts 45*b*, which can fit alternatively into the second set of internal clips 40*a* or may fit within an opening provided in this embodiment in the cooperating inserts 45*a* attached to the fireplace section 65 to allow the elements to be stacked as shown in the detailed views.

There is preferably an alternate screened cover 34 which may go in place of the solid cover 7 having the same width as the internal perimeter near the top of the fireplace section 65 in order to allow fire to be built and displayed after cooking or as an alternative to cooking.

The grill has a bottom section 1 and a middle section 2 for expanding the second diameter 71 of the bottom section to a first diameter 70 of the middle section 2.

There is at least one insert, here bottom depth extension 32, for separating the opening formed by the middle section 2 to a second smaller second diameter 71 which in this case can be opened with screens 57 or closed with panels 58 (FIGS. 7 and 11) to allow smoking or an open but screened in fire.

There is a rim insert 42 having a rim 44 corresponding in diameter to the first diameter 70 or slightly less so it is received by clip 40 on the perimeter of the middle section 2. Different cooking surfaces are provided on this insert 42; a screen for grilling, a flat frying surface, an open area for receiving and holding a reservoir of water, such as a pot, and an open area for receiving a wok as described above in reference to FIG. 13. There is also a hearth 33, here in sections, for enclosing at least a portion of the middle section. It also envisions a smoker or ash guard 32 expandable as shown in FIG. 11 to fit either diameter. This can protect a middle section with a first diameter 70 and a height 66 corresponding to an open fireplace.

The bottom section has a bottom section perimeter within the perimeter defined by the second diameter 71 and within the wider diameter 70 of the middle section 72 and further comprising a bottom depth extension 32 insertable removably within the bottom section 1 and said bottom depth extension having a bottom 72 open to the bottom section 1 and having a second height 67 above the first height 66 for increasing the height of the grill to allow for smoking or for a screened in fire.

The middle section further comprises a rim and said rim has a clip means (clips 35 and or 40) for receiving a rim insert 42 having a diameter equal to or just under the diameter of the middle section and for covering the middle section, said rim insert comprising a screen 46.

The rim insert further comprises a screen 46 with an open first area 74 and second area 73 and a flat frying surface, solid fryer section 47, insertable over the first area 74 of the screen and continuous with a portion of the middle section rim. The flat frying section further comprises a raised rim (44) separating the flat frying section from the screen of the second area 72. The grill comprises at least one ring means (ring 48 or 49) defining a height 75 above the solid fryer section (FIG. 12) and rising above solid fryer section and a locking means (clip 12 in FIG. 13) for securing the position of the ring means relative to the solid fryer section. The grill comprises at least one ring means defining a height above the solid fryer section and rising above solid fryer section and a locking means for securing the position of the ring relative to the solid fryer section. It has the stand 38 below the middle section (specifically also below and attached to the bottom section 1) and connected to the middle section and a plurality of supports 33*a* coming off the stand and around the circumference (or part of the circumference) of the stand and a hearth section 33 attachable to at least one of the supports for enclosing at least a portion of the circumference of the middle section.

The grill flexible frame 59 has a first width and second width and an adjusting means for adjusting the frame width between the first and second width and wherein the first width extend to the middle section perimeter defined by the diameter 70 and the second width extends to the bottom 72 to fit within the bottom section perimeter defined by the diameter 71.

The grill removable panel means comprises a plurality of guides means attached to the frame on either side of the plurality of screens for holding a plurality of the removable panels for covering the plurality of screens.

The at least one ring may comprise a fluid reservoir water holding means and a steamer means attached above reservoir water holding means.

Because many varying and different embodiments may be made within the scope of the inventive concept herein taught and because many modifications may be made in the embodiment(s) herein detailed in accordance with the descriptive requirements of the law, it is to be understood that the details herein are to be interpreted as illustrative and not in a limiting sense.

I claim:

1. A grill having a middle section with a first diameter and a first height of an open fireplace and a rim along the middle section height forming a middle section perimeter and further comprising a bottom section below the middle section and and a bottom section perimeter below the perimeter of the middle section, said grill further comprising a bottom depth extension which engages the upper rim of the bottom section, said bottom depth extension having a bottom open to the bottom section and further comprising a stand below the middle section and connected to the middle section, a plurality of removable supports coming with a circumference off the stand and around the circumference of the stand and a plurality of interconnecting hearth sections attachable to at least one of the supports for enclosing at least a portion of the perimeter of the middle section.

2. The grill of claim 1 wherein the bottom depth extension comprises a plurality of screens contained in a flexible frame.

3. The grill of claim 2 wherein the flexible frame has a first width and second width and an adjusting means for adjusting the frame between the first and second width and wherein the first width extends to the middle section perimeter and the second width extends to the bottom section perimeter.

4. A grill having a middle section with a first diameter and a first height of an open fireplace and a rim along the middle section height forming a middle section perimeter and further comprising a bottom section below the middle section and and a bottom section perimeter below the perimeter of the middle section, said grill further comprising a bottom depth extension which engages the upper rim of the bottom section, said bottom depth extension having a bottom open to the bottom section and wherein the bottom depth extension comprises a plurality of screens contained in a flexible frame and wherein the flexible frame has an adjusting means for adjusting the frame between the middle section perimeter and the bottom section perimeter and wherein the removable panel means comprises a plurality of guides means attached to the frame on either side of the plurality of screens for holding a plurality of the removable panels for covering at least one of the plurality of screens.

\* \* \* \* \*